March 19, 1968 R. W. SUMAN ET AL 3,373,829
WEIGHING MECHANISM FOR RAILROAD CAR DUMPERS
Filed July 20, 1966 3 Sheets-Sheet 1
FIG.1
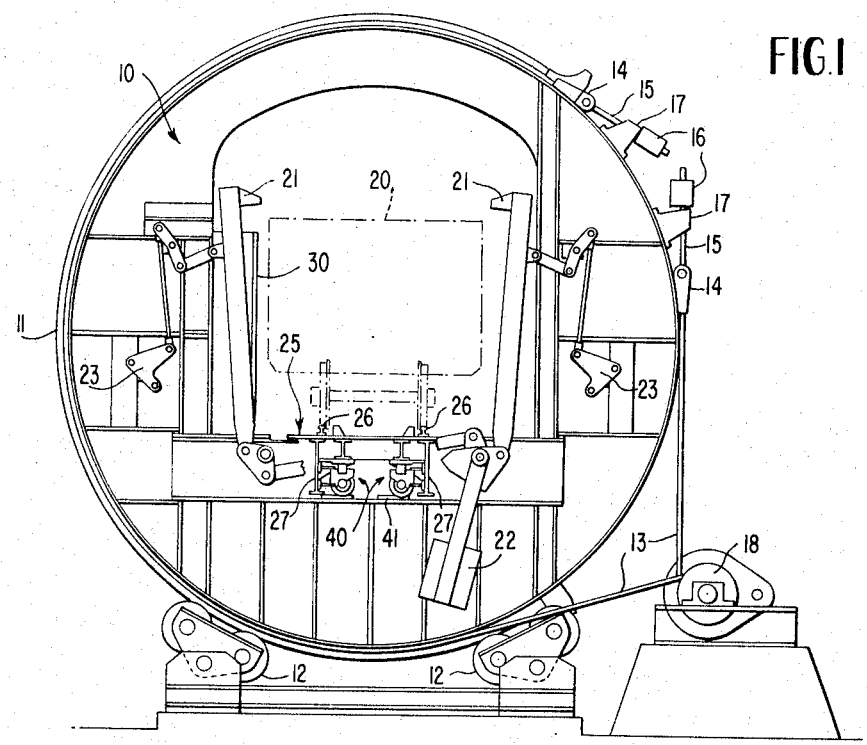
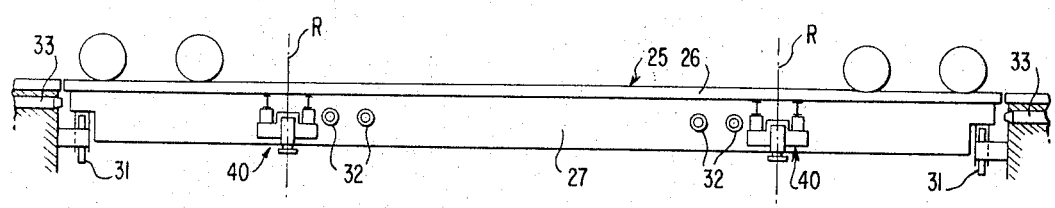
FIG.2
FIG.3
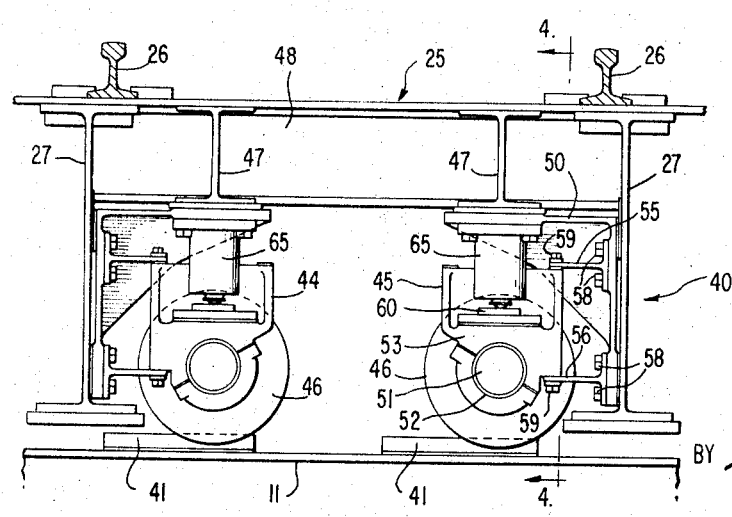
INVENTORS
ROBERT W. SUMAN
KENNETH E. THOMSEN
BY *Irons, Birch, Swindler & McKie*
ATTORNEYS March 19, 1968   R. W. SUMAN ET AL   3,373,829
WEIGHING MECHANISM FOR RAILROAD CAR DUMPERS
Filed July 20, 1966   3 Sheets-Sheet 2

INVENTORS
ROBERT W. SUMAN
KENNETH E. THOMSEN
BY *Jnan, Birch, Swindler & McKie*
ATTORNEYS March 19, 1968  R. W. SUMAN ET AL  3,373,829
WEIGHING MECHANISM FOR RAILROAD CAR DUMPERS
Filed July 20, 1966  3 Sheets-Sheet 3

INVENTORS
ROBERT W. SUMAN
KENNETH E. THOMSEN

BY *Irons, Birch, Swindler & McKie*

ATTORNEYS

United States Patent Office 3,373,829
Patented Mar. 19, 1968

3,373,829
WEIGHING MECHANISM FOR RAILROAD CAR DUMPERS
Robert W. Suman, Hatboro, Pa., and Kenneth E. Thomsen, Northbrook, Ill., assignors to Link-Belt Company, a corporation of Illinois
Filed July 20, 1966, Ser. No. 566,573
16 Claims. (Cl. 177—132)

This invention relates generally to the art of rotary railroad car dumpers. The invention is particularly concerned with weighing means used in conjunction with a car dumper for weighing the car before and after dumping its contents, whereby a record may be made of the weight of the material delivered by each railroad car at the point of delivery.

Car dumpers equipped with weighing means for weighing the car before and after dumping have been known heretofore. However, previous proposals in this area have presented serious disadvantages. Many of the prior art systems proposed weighing a significant portion of the entire rotary car dumper structure, including the car carrying platform, the substantially invertible supporting structure for such platform and the railroad car. Since the substantially invertible supporting structure must be massive and therefore extremely heavy to perform its function of supporting and inverting a railroad car, it follows that the weighing capacity of scales to weigh the heavy support structure and car together must be of great strength and consequently of high cost. Also, since the weight of the supporting structure is high in proportion to the weight of the material carried by the car, determination of the material weight involves the difference between two large weight numbers, and, therefore, small errors in determining either of the numbers involved lead to large errors in the resulting weight determination of the load of material.

The incorporation of the weighing mechanism into the substantially invertible structure itself has been undertaken. Although these proposals overcame some of the difficulties described above, they raised additional difficulties of their own. First, because of the added depth and width involved in carrying out these proposals, the weighing mechanism could not easily be added to existing rotary car dumpers. Also these weighing constructions did not permit economical construction of a car dumper to which the weighing system could later be added where, because of budget limitations or lack of initial need, the car dumper as originally purchased did not call for inclusion of a weighing mechanism. These constructions have called for carriers having a double set of longitudinal beams, one pair supporting the weight of the railroad car and the other pair being deeper and spaced outwardly of the first pair to complete the carrier which shifts laterally on rollers when the car is being dumped, the weighing means being interposed between the two pairs of beams. This type construction added significantly to its cost and weight.

It is an object of the present invention to overcome these prior art shortcomings by providing a weighing mechanism of simple and inexpensive design which can be added to existing car dumpers.

It is a further object of this invention to produce a simple and inexpensive car dumper which can be economically manufactured either with or without the weighing mechanism incorporated therein.

The weighing system of the present invention utilizes a weighing device in the form of a load cell interposed between the substantially invertible supporting structure of the dumper and a load table which carries the railroad car but which is movable laterally with respect to the supporting structure. The load cell may be of a conventional type, for example, that manufactured by Streeter-Amet, Grayslake, Ill., and the Baldwin-Lima-Hamilton Corporation of Philadelphia, Pennsylvania. These load cells are positioned in thrust relationship between the load table and the rollers which mount the table for lateral shifting movement relative to the supporting structure. The connecting means between the load cell and the supporting structure is so constructed as to enable the load cells to be positioned between the usual load table beams. This construction enables the weighing mechanism to be installed in an existing structure without increasing the width or depth of beams that carry the railroad car. This construction also enables the same size members to be used in constructing the substantially invertible structure whether the structure is built with or without the weighing mechanism originally incorporated therein. Furthermore, the weighing mechanism is preferably located directly over each supporting ring of the substantially invertible structure. This construction minimizes possible inaccuracies in the weighing operation.

Other more detailed objects and advantages of the invention will become readily apparent from the following description of certain preferred embodiments of this invention. In the accompanying drawings:

FIGURE 1 is an end elevational view of a rotary car dumper generally illustrating the manner of incorporation of the weighing mechanism therein;

FIGURE 2 is a side elevational view diagramatically illustrating the association of the weighing mechanism with the load receiving table;

FIGURE 3 is a cross sectional view through the load table showing an embodiment of a weighing assembly for the weighing mechanism;

Figure 4:
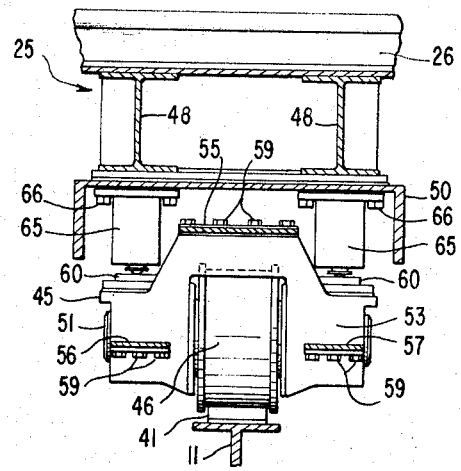
FIGURE 4 is a sectional view taken on line 4—4 of FIGURE 3.

The drawings have been simplified by omitting features which are generally recognized as conventional in the rotary car dumper art. The patents of Kidder 1,768,849; Erickson 1,812,040; and Heaton et al. 1,821,217 may be noted as illustrating more specific features of rotary car dumpers of the general type with which the weighing mechanism of the instant invention may be employed.

Referring to FIGURES 1 and 2, the dumper of the present invention comprises an elongated, substantially invertible structure, indicated generally at 10, including a pair of spaced rings 11 supported on roller assemblies 12. This structure is turned upon the roller assemblies 12 by any suitable means, as for example, cables 13.

Each cable 13 extends around one of the rings 11 with the cable ends each having a clevis 14 pivotally connected to a rod 15 which in turn has a compression spring and stop 16 threaded on the end thereof. The rods 15 pass through brackets 17 fastened to the perimeter of the ring 11 with which the cable is associated. Power is furnished to turn the structure 10 by cable 13 passing around a drum 18 which is reversibly driven in rotating the structure 10 from its upright position as shown in FIGURE 1 to its inverted position incident dumping the load from a car 20 shown in phantom on FIGURE 1 disposed within the elongated, substantially invertible structure.

As is conventional in rotary car dumpers, suitable clamps 21 are provided associated with each ring 11 to move into engagement with and hold the railroad car while the car is being inverted to dump its load. Mechanically operated clamps are illustrated in FIGURE 1. Since the particular form of clamp forms no part of the invention, it will not be described in detail. If desired, one of the type clamps illustrated in the above-mentioned patents could be employed in place of the clamp construction shown in FIGURE 1.

In the mechanically operated embodiment to the extent shown in FIGURE 1, a counterweight 22 acts through appropriate linkage to pull the clamps 21 down against the opposite top edges of the car 20 as the structure 10 starts its movement to invert the car. This inverting movement of the structure 10 engages the free end of each bell crank 23 with a stationary cam track (not shown) which through the linkage illustrated acts to move the clamps inwardly against the sides of the car 20. After the car 20 has been unloaded and the structure 10 is returned to its upright position, the counterweight 22 and cam tracks acting on bell cranks 23 return the clamps 21 to their retracted position as shown in FIGURE 1.

The substantially invertible structure 10 includes in addition to the pair of rings 11, a load receiving table 25 which serves to carry the car 20 on standard railroad rails 26 secured longitudinally of load table 25. The load table 25 is principally formed by a pair of table beams 27 extending longitudinally of the table beneath the rails 26.

As will be described in more detail hereinafter, the load table 25 is mounted on rollers such that when the structure 10 supporting a car to be unloaded is rotated counterclockwise as shown in FIGURE 1, the load table 25 and car 20 supported thereon will shift laterally to engage against a side rest 30, as is well known in rotary car unloaders such as illustrated in the above-mentioned patents. When the structure 10 is returned to its upright position, the table 25 is returned to its centered position by engaging side thrust rollers 31 acting against the force of spring pushers 32, both diagrammatically illustrated on FIGURE 2. These features are also well known, such as illustrated in the above-identified Heaton et al. patent. When a railroad car is being introduced onto or removed from load table 25 the table may be suitably secured by end lock pins 33, these pins being shown in their withdrawn position on FIGURE 2. Also on FIGURE 2 the general relationship that the wheels of the railroad car 20 will have when centered on the load table 25 is illustrated.

The principal structural members for the substantially invertible structure 10 have been omitted on FIGURE 2 to simplify the showing of the relationship of each weighing assembly 40 to the load table 25. The weighing mechanism is comprised of two assemblies 40, one associated with each ring 11. The center lines for the two rings 11 in the car dumper of this invention are represented by lines R on FIGURE 2. Each weighing assembly 40 is in turn made up of two weighing units which will be described hereinafter with reference to the several preferred embodiments illustrated in FIGURES 3 to 10. In each embodiment of the weighing mechanism as described hereinafter, the rollers which support the load table 25 permit it to shift laterally for a limited distance as the car 20 is inverted and engage with a bearing plate 41 which is supported on and secured to a structural portion of the ring 11 with which the weighing assembly 40 is associated.

Referring now to the embodiment of the weighing assembly as illustrated in FIGURES 3 and 4, in this particular embodiment the assembly 40 is made up of two similar units 44 and 45. These units are secured to the webs of the beams 27 of load receiving table 25 to be disposed in between such beams. Each unit rotatably supports a roller 46 the tread of which rests on a bearing plate 41.

At the location for each weighing assembly 40, parallel cross beams 48 are disposed bridging the webs of the table beams 27. In addition, the webs of beams 48 are bridged by I-beams 47. The underside of beams 48 and 47 together with the faces of the webs of the table beams 27 provide bearing surfaces to which the respective weighing units 44 and 45 are appropriately secured as by bolts (not shown). Only one weighing unit will be described in detail and since unit 45 is shown in section of FIGURE 4, this particular unit will be described with reference to FIGURES 3 and 4.

Unit 45 is made up of a generally L-shaped housing 50. The roller 46 which is flanged as shown in FIGURE 4 to engage with its bearing plate 41 has a shaft 51 which is journaled at its opposite ends in bearings 52. These bearings are part of a carrier 53. Carrier 53 is supported on the vertical wall of housing 50 by three flexure plates 55, 56 and 57. As shown in FIGURE 4, the upper flexure plate 55 is somewhat wider than each of the lower flexure plates 56 and 57. Each flexure plate has a T-base as shown in FIGURE 3, with the base of each flexure plate secured by bolts 58 to the vertical wall of housing 50. Likewise, the outer end of each flexure plate 55, 56 and 57 is secured to carried 53 by bolts 59.

The supporting relationship of the flexure plates 55, 56 and 57 to the carrier 53 which rotatably mounts roller 46 is such that the stresses that may be encountered incident operation of the railroad car dumper transmitted from the load table 25 through the rollers 46 to the rings 11 of the supporting structure 10 will not unduly shift the carrier 53 from its desired position for engaging the roller 46 with its bearing plate 41. At the same time the flexure plate mounting of the carrier 53 permits a degree of freedom of movement of the housing in a generally vertical direction such that weighing of the table 25 and car with or without the contents supported thereon may be effectively achieved.

The carrier 53 carries a pad 60 on a planar surface generally disposed above each of the journals 52 for the roller mounting shaft 51. Directly above each pad 60 there is mounted a weighing device 65 which may be a load cell as mentioned heretofore. This device is secured to the horizontal portion of L-shaped housing 50 by means of bolts 66. The load sensing button on the lower end of each load cell 65 transmits to the pad 60 on carrier 53 the weight of the table 25 and matter carried thereon. Thus the compressive force detected by the two load cells for each weighing unit 44 and 45 provides an indication of the load carried on table 25. To accommodate slight movements between the positions of the load cells and carrier, the pads 60 may be secured to the carrier 53 with Fabreeka or Lubrite slide plates therebetween.

With four load cells for the two weighing units of each weighing assembly 40 and in turn thus eight load cells transmitting the weight of the table and matter thereon to the four carriers 53 carrying the rollers 46, the total of the readings for these eight load calls is indicative of the weight of the table and matter thereon.

As mentioned heretofore, load cells or other weighing means capable of detecting the magnitude of a compressive force are readily available to be suitable for incorporation in the weighing units as described herein. Thus, it is not believed necessary that a description of the internal construction and operation of such load cells be included herein. It is known that load cells such as are suitable for use herein undergo only very slight shortening in length in detecting substantial loads of 50,000 to 100,000 pounds in magnitude. Accordingly, the flexure plates 55, 56 and 57 as employed to hold the carrier 53 and roller 46 in proper position, undergo very slight flexing and do not interfere with obtaining a satisfactorily accurate reading of the weight transmitted through each roller and bearing plate with a totalling of the readings of the eight load cells 65 giving the table and car weight.

Figure 5:
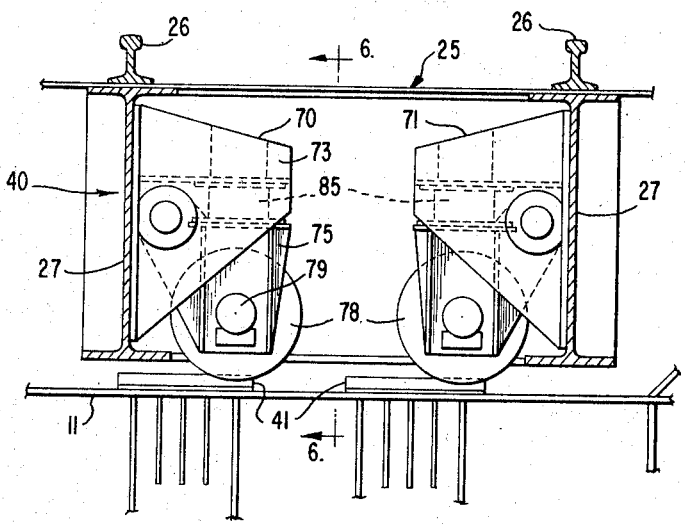
FIGURE 5 is a view similar to FIGURE 3 showing another embodiment of the invention.
Figure 6:
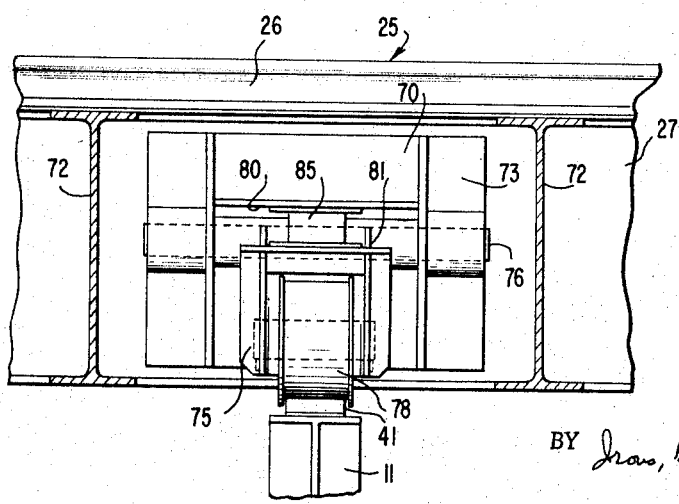
FIGURE 6 is a sectional view taken on line 6—6 of FIGURE 5.
Figure 7:
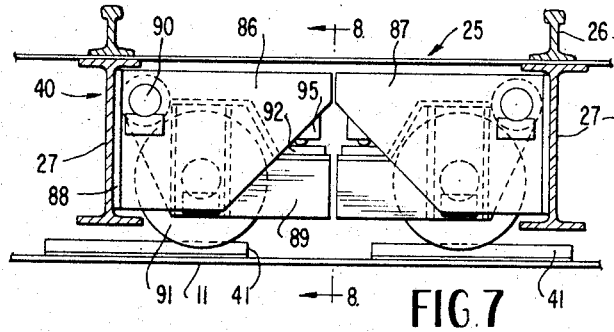
FIGURE 7 is a view similar to FIGURE 3 showing a further embodiment of the invention.
Figure 8:
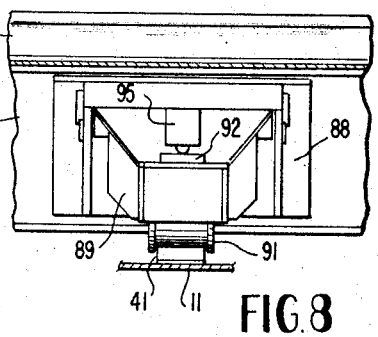
FIGURE 8 is a sectional view taken on line 8—8 of FIGURE 7.

Turning to the embodiment shown in FIGURES 5 and 6, the structure of the load table 25 carrying railroad rails 26 and the construction of the ring 11 of the substantially invertible structure 10 for the car dumper with such ring supporting bearing plates 41, is the same as described heretofore with reference to FIGURES 1 to 4. The weighing mechanism is again made up of two weighing assemblies 40, one located in association with each ring of the supporting structure. Also, each weighing assembly is made up of two similar units identified 70 and 71. Each unit is mounted on the web of one of the table beams 27 such that the two units are disposed between the parallel table beams 27. Since the weighing units 70 and 71 are similar in construction, description of only one unit, namely unit 70, will be set forth in detail. At the location for each weighing assembly the load table 25 is reinforced by cross beams 72.

Each weighing unit is made up of a housing 73 which is appropriately secured to the web of one of the table beams 27. A carrier 75 is provided with a shaft 76 which is journaled in housing 73. This carrier supports flanged roller 78 which, like the previously described embodiment, has a shaft 79 journaled in the carrier 75. The housing 73 provides a downwardly facing ledge 80 opposite an upwardly facing shelf 81 on carrier 75. A weighing device 85 of the so-called pancake type load cell variety is disposed between ledge 80 and shelf 81.

It will thus be appreciated that the weight of the load table 25 and matter supported on the table will be transmitted through load cell 85 to roller 78 and thence to bearing plate 41 thereby providing an indication of the magnitude of the portion of the weight of the table and load thereon carried by the weighing unit. In this embodiment the two load cells 85, one in each of weighing units 70 and 71, will indicate the load transmitted to one of the rings 11 and in turn the four pancake load cells 85 incorporated in the two weighing assemblies 40 will give in their total an indication of the load table weight and weight of the car with or without contents supported on such table.

In the embodiment shown in FIGURES 7 and 8, again load table 25 with rails 26 and the formation of rings 11 as part of the substantially invertible structure of the dumper with the rings supporting bearing plates 41 are similar to that heretofore described. Also the weighing assembly 40 in this embodiment is mounted intermediate and supported on the webs of the table beams 27. Further, each weighing assembly 40, one for each of the rings 11 associated with the car dumper, is made up of two weighing units identified 86 and 87. Since these units are similar in construction, the details of only one unit, namely unit 86, will be set forth hereinafter.

Unit 86 includes a housing 88 secured to thew eb of table beam 27. This housing supports a carrier 89, the carrier having a shaft 90 which is journaled in the housing such that the carrier is capable of swinging relative to its housing. A flanged roller 91 engages with a bearing plate 41, the roller being supported on a shaft journaled in carrier 89.

Carrier 89 has an extension projecting forwardly from the axis of the shaft mounting roller 91. This extension carries a pad 92. A weighing device 95 shown as a load cell, is mounted on the housing 88 projecting downwardly with the load sensing button of the cell engaging with the upwardly facing pad 92 on carrier 89. It is pointed out that the forwardly projecting extension on carrier 89 positions pad 92 well below the upper wall of housing 88 to provide space for the load cell. This embodiment is particularly advantageous for use with shallow depth table beams 27 since the weighing units 86 and 87 are quite flat. It will be appreciated that the compressive force sensed by the load cell 95 under the weight of table 25 and matter carrier thereon will give an indication of the total weight transmitted through the roller 91 to bearing plate 41. Thus the two load cells of one weighing assembly at one ring 11 combined with the readings of the two load cells of the other weighting assembly at the other ring 11 will be indicative of the total weight of the load table 25 and car supported thereon.

Figure 9:
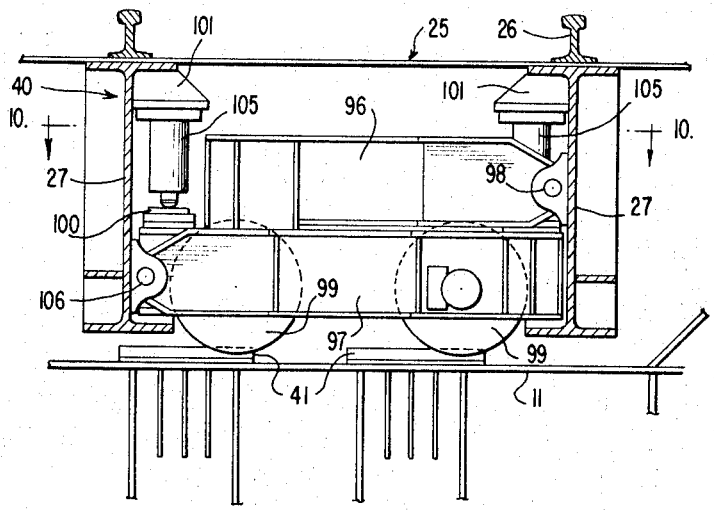
FIGURE 9 is another view similar to that of FIGURE 3 illustrating still another embodiment of the invention.
Figure 10:
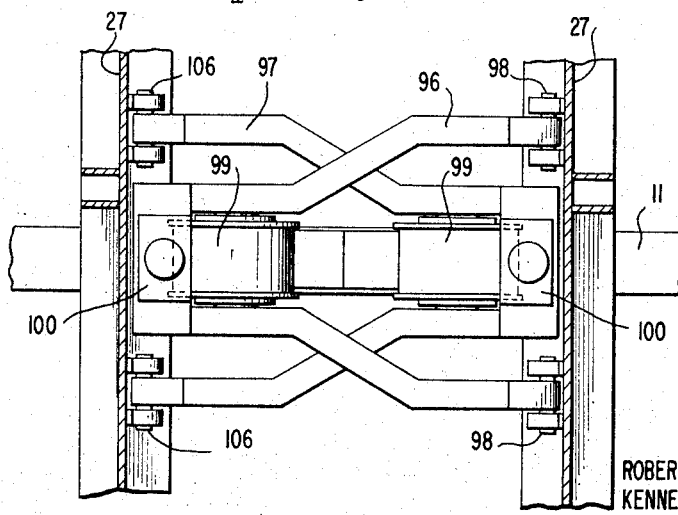
FIGURE 10 is a sectional view taken on line 10—10 of FIGURE 9.

FIGURES 9 and 10 show a further embodiment of the invention associated with a load table 25 and car dumper embodying rings 11 such as described hereinabove with the ring structure again mounting bearing plates 41. Also, the weighing mechanism of this embodiment is associated with and disposed between the webs of the pair of table beams 27. Further, in general similarity to the embodiments described hereinabove, two weighing assemblies 40 are provided, one associated with each ring of the substantially invertible structure 10 and with each weighing assembly being composed of two weighing units 96 and 97.

Weighing unit 96 in the form of a yoke with the arms of the yoke pivotally connected at 98 to the web of one table beam 27. A flanged roller 99 is rotatably supported between the arms of the yoke with the extension of the yoke beyond the location of roller 99 providing an upwardly facing pad 100. A bracket 101 is mounted on table beam 27 to provide a downwardly facing ledge to which is secured a weighing device 105 shown as a load cell. It will thus be appreciated that load cell 105 with the load sensing button thereof pressing downwardly against pad 100 will respond and detect the weight transmitted through bracket 101 to roller 99 and bearing plate 41.

Weighing unit 97 is generally similar to weighing unit 96 except that the arms of the yoke forming weighing unit 96 pass above the yoke of unit 97 and then downwardly to the supporting point for roller 99. In the case of weighing unit 97 the ends of the yoke arms are pivotally secured at 106 to the web of one of the table beams 27 and these arms extend on the outside of the corresponding arms of weighing unit 96 converging inwardly to the point where the flanged roller 99 is rotatably mounted between the legs. An upwardly facing pad 100 is secured forwardly of the location of the roller 99 on the yoke of unit 97 as in the case of unit 96. Above this pad there is mounted a bracket 101 with a weighing device 105 in the form of a load cell mounted between the bracket and pad 100 to transmit compressive force from the bracket to roller 99.

It will again be appreciated that the four weighing devices 105, shown as load cells, two in each weighing assembly to make up the weighing mechanism, will in the total of their readings give an indication of the weight sensed as representative of the weight of table 25 and the matter supported on such table.

Although the present invention has been illustrated and described with reference to a specific embodiment, it will be understood that various changes and modifications in the arrangement of parts and components may be made by persons skilled in the art without departing from the spirit or scope of the invention which is defined by the appended claims.

What is claimed is:
1. A railroad car dumper comprising
   a load receiving table having rails to support and guide a railroad car introduced into and removed from said dumper,
   a substantially invertible supporting structure for carrying said table mounted to rotate with the car and table in emptying the contents of the car,
   weight transmitting means supporting said load receiving table within said substantially invertible supporting structure to permit limited lateral shifting movement of said table relative to said supporting structure incident inversion of said structure and table to empty a car, said weight transmitting means including a plurality of rotatably mounted rollers each associated with bearing plate means engaged with the periphery of the roller and at least one weighing device disposed in compressive relation with each associated roller and bearing plate means to detect the portion of the weight of said table and the car supported on said table that is transmitted through each associated roller and bearing plate means whereby the total of the detected weights of said weighing devices is indicative of the weight of said table and car supported thereon.

2. A railroad car dumper as recited in claim 1 wherein said rollers are carried by said load receiving table and said bearing plate means are mounted on said substantially invertible supporting structure.

3. A railroad car dumper as recited in claim 2 wherein said weighing devices are mounted between said rollers and said load receiving table to transmit the weight of said table and car supported thereon to said rollers and thence through said rollers to said bearing plate means and said substantially invertible supporting structure on which said bearing plate means are mounted.

4. A railroad car dumper as recited in claim 3 wherein said load receiving table includes parallel I-beams extending longitudinally of said table, said rollers and weighing devices being disposed intermediate the webs of said I-beams.

5. A railroad car dumper as recited in 2 wherein each of said rollers is yieldably connected to said load receiving table to accommodate limited movement of the roller relative to the plane of said table while restraining the rotational axis of the roller to remain parallel to said plane of said table.

6. A railroad car dumper as recited in claim 5 wherein the yieldable connection of each roller to said load receiving table comprises a carrier in which the roller is rotatably supported, said carrier being connected to said table by flexure plates.

7. A railroad car dumper as recited in claim 5 wherein the yieldable connection of each roller to said load receiving table comprises a carrier in which the roller is rotatably supported, said carrier being pivotally connected to said table.

8. A railroad car dumper comprising
a load receiving table having rails to support and guide a car introduced into and removed from said dumper, said table being provided with support rollers to permit limited lateral shifting movement of said table incident inversion of said table to empty the car,
a substantially invertible supporting structure mounted to rotate with the railroad car and said table supported therein in emptying the contents of the car, said structure having bearing plate means engaged by said support rollers to accommodate lateral shifting of said table relative to said supporting structure when the car is being emptied,
and at least one weighing device disposed in compression relation between each said roller and said load receiving table effective to detect the portion of the weight of said table and the car supported on said table that is transmitted to each said roller whereby the total of the detected weights of the weighing devices is indicative of the weight of said table and car supported thereon.

9. A railroad car dumper as recited in claim 8 wherein each roller is rotatably mounted in a carrier which is yieldably connected to said load receiving table to permit limited movement of the carrier relative to the plane of said table while restraining the rotational axis of the roller to remain parallel to said plane of said table, and said weighing device comprises a load cell positioned in compressive and weight transmitting relation between said carrier and said table.

10. A railroad car dumper as recited in claim 9 wherein said carrier is connected to said table by flexure plates.

11. A railroad car dumper as recited in claim 9 wherein said carrier is pivotally connected to said table.

12. A railroad car dumper as recited in claim 9 wherein each associated roller, carrier and load cell combination is mounted in a housing to constitute a weighing unit, said housing being detachably mountable on said table in furnishing weighing units to existing rotary car dumpers.

13. A railroad car dumper as recited in claim 12 wherein said load receiving table includes parallel I-beams extending longitudinally of said table and said supporting structure includes a pair of rings perpendicular to and spaced longitudinally of said table, a pair of said weighing units being secured to the inwardly facing surfaces of the webs of said I-beams at each of said rings whereby the total of the detected weights of the load cells in each of the four weighing units is indicative of the weight of said table and car supported thereon.

14. A railroad car dumper comprising
a load receiving table including parallel I-beams extending longitudinally of said table and having rails to support and guide a car introduced into and removed from said dumper,
a substantially invertible supporting structure for carrying said table having a pair of rings perpendicular to and spaced longitudinally of said table, said structure being mounted to rotate with the car and table in emptying the contents of the car,
drive means connected to said substantially invertible structure to rotate it on its mounting in emptying a railroad car,
clamp means operable incident emptying a car to hold the car while being inverted to empty its contents,
weight transmitting means supporting said load receiving table within said substantially invertible structure including a weighing assembly disposed as each of said rings with each said assembly consisting of a pair of weighing units,
each said weighing unit including a rotatably mounted roller associated with bearing plate means engaged with the periphery of said roller and at least one load cell disposed in compressive relation with said roller and bearing plate means to detect the portion of the weight of said table and the car supported on said table that is transmitted through said roller and bearing plate means whereby the total of the detected weights of the load cells in said weighing units is indicative of the weight of said table and car supported thereon.

15. A railroad car dumper as recited in claim 14 wherein each roller is rotatably mounted in a carrier which is yieldably connected to said load receiving table to permit limited movement of the carrier relative to the plane of said table while restraining the rotational axis of the roller to remain parallel to said plane of said table.

16. A railroad car dumper as recited in claim 15 wherein each said weighing unit incorporating a roller, carrier and load cell combination includes a housing detachably mountable on said table in furnishing weighing units to existing rotary car dumpers.

References Cited

UNITED STATES PATENTS

| 852,643 | 5/1907 | Aldrich | 177—132 X |
| 3,141,516 | 7/1964 | Moring et al. | |

FOREIGN PATENTS 757,028  9/1956  Great Britain.

RICHARD B. WILKINSON, *Primary Examiner.*

G. H. MILLER, JR., *Assistant Examiner.*